US008373368B2

(12) United States Patent
Achiriloaie et al.

(10) Patent No.: US 8,373,368 B2
(45) Date of Patent: Feb. 12, 2013

(54) ENERGY STORAGE DEVICE

(76) Inventors: Ioan Achiriloaie, Dallas, TX (US);
Bogdan V. Antohe, Dallas, TX (US)

( * ) Notice: Subject to any disclaimer, the term of this patent is extended or adjusted under 35 U.S.C. 154(b) by 539 days.

(21) Appl. No.: 12/686,381

(22) Filed: Jan. 13, 2010

(65) Prior Publication Data

US 2010/0199803 A1 Aug. 12, 2010

Related U.S. Application Data

(60) Provisional application No. 61/151,175, filed on Feb. 9, 2009.

(51) Int. Cl.
*H02K 7/02* (2006.01)
(52) U.S. Cl. ...................................... 318/161
(58) Field of Classification Search .............. 318/161
See application file for complete search history.

(56) References Cited

U.S. PATENT DOCUMENTS

| 3,248,967 A | 5/1966 | Lewis |
| 3,749,194 A * | 7/1973 | Bardwick, III ............... 180/165 |
| 3,863,510 A | 2/1975 | Benson |
| 3,970,917 A | 7/1976 | Diggs |
| 4,036,080 A * | 7/1977 | Friedericy et al. ......... 74/572.11 |
| 4,335,627 A | 6/1982 | Maxwell |
| 4,341,001 A | 7/1982 | Swartout |
| 4,446,418 A | 5/1984 | Richardson |
| 4,509,006 A | 4/1985 | Pinson |
| 4,546,264 A | 10/1985 | Pinson |
| 4,725,766 A | 2/1988 | Pinson |
| 4,730,154 A | 3/1988 | Pinson |
| 4,821,599 A | 4/1989 | Medlicott |
| 4,926,107 A | 5/1990 | Pinson |
| 4,928,553 A | 5/1990 | Wagner |
| 4,995,282 A | 2/1991 | Schumacher |
| 5,086,664 A | 2/1992 | Wagner |
| 5,268,608 A | 12/1993 | Bitterly |
| 5,351,574 A | 10/1994 | Hiraishi |
| 5,816,924 A | 10/1998 | Kajitani |
| 5,823,880 A | 10/1998 | Kajitani |
| 6,160,336 A * | 12/2000 | Baker et al. .................... 310/74 |
| 6,616,115 B1 | 9/2003 | Griswold |
| 6,819,012 B1 | 11/2004 | Gabrys |
| 6,883,399 B2 | 4/2005 | Burstall |
| 6,921,998 B2 | 7/2005 | Giles |
| 6,995,529 B2 | 2/2006 | Sibley |
| 7,023,103 B2 | 4/2006 | Zinck |
| 7,044,022 B2 | 5/2006 | Kim |
| 7,172,523 B2 * | 2/2007 | Borghi ........................ 474/13 |

OTHER PUBLICATIONS

Leung, Ted, Concept of a Modified Flywheel for Megajoule Storage and Pulse Conditioning, IEEE Transactions on Magnetics, Jan. 1991, p. 403-408, vol. 27, No. 1.

* cited by examiner

*Primary Examiner* — Rina Duda
(74) *Attorney, Agent, or Firm* — Mircea Achiriloaie

(57) ABSTRACT

An energy storage device having a variable momentum of inertia uses centrifugal forces acting on movable masses to self adjust its moment of inertia. The adjustment of the moment of inertia occurs without any additional energy input. Energy is stored as rotational kinetic energy and potential elastic and/or gravitational energy.

10 Claims, 4 Drawing Sheets

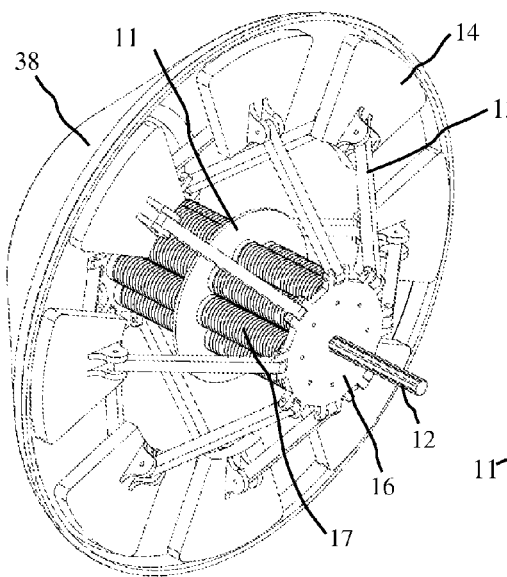
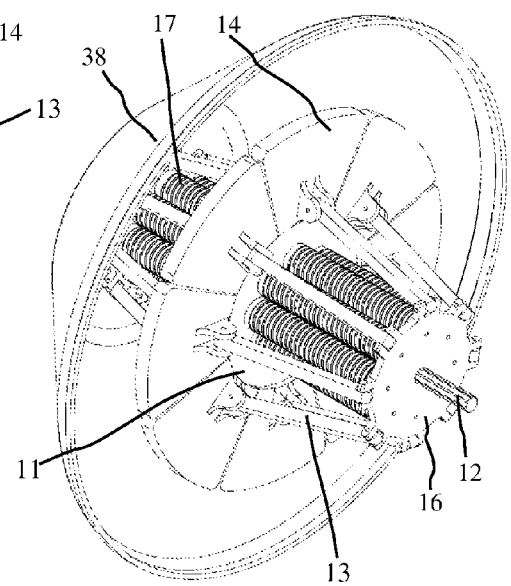
FIG. 4A FIG. 4B
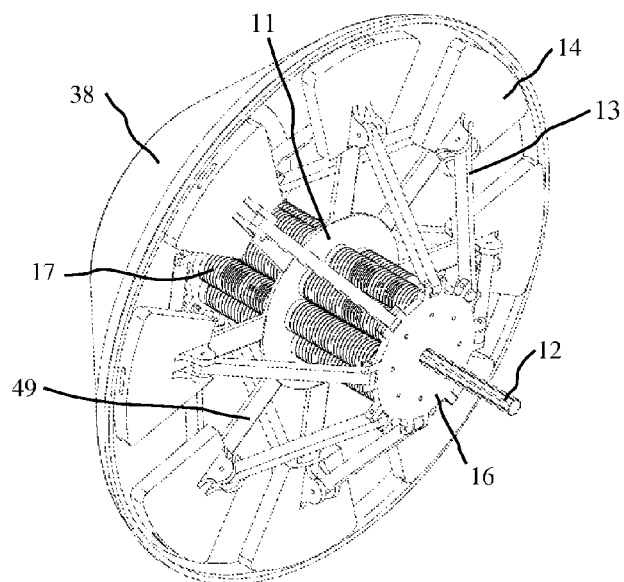
FIG. 4C

ENERGY STORAGE DEVICE

REFERENCE TO RELATED APPLICATIONS

This application claims the benefit of U.S. Provisional Application Ser. No. 61/151,175, filed Feb. 9, 2009, the entire contents of which are incorporated herein by reference.

FIELD OF INVENTION

The invention relates to methods and devices for storage of energy, and more specifically to flywheels that store energy in both kinetic and potential energy form.

BACKGROUND OF INVENTION

Flywheels are employed to store energy as rotational kinetic energy when the production exceeds demand or in machines that require large amounts of energy for short periods of time. In case of the production of electrical energy from wind, for example, it is typical to have excess energy with respect to demand in high wind conditions. For wind farm applications, the excess energy can be stored in a flywheel as rotational kinetic energy and released as electrical energy (power) when the demand becomes larger than the energy (power) produced.

To maximize the amount of stored energy, the moment of inertia and the angular velocity of a flywheel need to be as large as feasible. A flywheel with a fixed moment of inertia has the following characteristics: a) the release of rotational kinetic energy by the flywheel results in a decrease in its angular velocity, and b) the acceleration of the flywheel to the nominal angular velocity takes a long time. These characteristics are undesirable for certain applications partly because of they require output power conditioning. Thus, quickly achieving the nominal angular velocity and maintaining it within a narrow range while storing or releasing energy are desirable. These can be achieved by changing the moment of the inertia of the flywheel during operation. Accordingly, the moment of inertia should be small in the acceleration period, increase to a maximum to store the largest amount of energy possible, and then vary to maintain the nominal angular velocity as close to constant as possible.

Previous solutions of changing the moment of inertia of a flywheel have been based on hydraulic or mechanical systems. Some solutions consist of adding fluid to a hollow flywheel, fluid that is distributed to the outer region by the centrifugal force as described in U.S. Pat. No. 4,335,627 to Maxwell (1982) and U.S. Pat. No. 5,086,664 to Wagner (1992). Other solutions force the fluid between locations along the radius by pistons in cylinders placed radially as shown in U.S. Pat. No. 3,248,967 to Lewis (1966), by pumps between cavities that are placed at two different radii as described in U.S. Pat. No. 6,883,399 to Burstall (2004), or between cells that are arranged to control the mass distribution as presented by U.S. Pat. No. 4,546,264 to Pinson (1985). Mechanical means to vary the moment of inertia include the motion of two articulated counterweights that are moved away from the axis of rotation using a rack and pinion actuator as shown in U.S. Pat. No. 3,863,510 to Benson (1975). U.S. Pat. No. 4,725,766 (1988) and U.S. Pat. No. 4,730,154 (1988) both to Pinson describe the use of masses that can be moved along radial spokes by means of actuators. U.S. Pat. No. 4,926,107 to Pinson (1990) describes several methods to change the moment of inertia by employing either masses that are moved along spokes by actuator or fixed masses that are articulated at the hub in an "umbrella" configuration and swing away radially under the control of their respective drive motors. U.S. Pat. No. 4,995,282 to Schumacher (1999) describes a variable inertia flywheel using two masses that are mechanically pushed along the radial direction. U.S. Pat. No. 7,044,022 to Kim (2006) presents a variable inertia flywheel that is composed of a rotatable member and a body, both containing channels that guide movable masses. The rotatable member can be rotated with respect to the body hydraulically moving the masses along the radial direction. Leung in "IEEE Transactions on Magnetics, Vol. 27, January 1991" describes using a flywheel with variable moment of inertia for pulse conditioning for electromagnetic launch. U.S. Pat. No. 5,531,574 to Hiraishi et al. (1994) describes a variable inertia flywheel that is based on the motion of masses placed in cavities inside the flywheel. The masses are not connected to the cavities with the relative placement between the masses and the flywheel determined by the centrifugal force.

Many of the proposed solutions make the adjustment of the flywheel's moment of inertia by external means. Consequently, they require the input of additional energy into the system as well as separate means of control. This complexity introduces multiple potential points of failure and increases manufacturing and operation costs. Some of the proposed solutions are not designed primarily for efficient energy storage or conversion. Besides, flywheels operate at high velocities, imposing strict safety and durability constrains on the materials, and making implementation of some of the complex designs described in the literature even more challenging. The systems that employ liquids to adjust the moment of inertia do not have a large range of adjustment due to the smaller liquid density which results in a smaller mass Thus, a current need remains for energy storage devices that improve the energy storage and operational characteristics of existing flywheels.

SUMMARY OF INVENTION

The present invention relates to an energy storage device. The device comprises a shaft, several masses, and adjustable linking elements for attaching each of the masses to the shaft and synchronizing their motion.

The shaft allows input and output of energy in the form of shaft kinetic energy. The shaft also supports the attached masses via the synchronized adjustable linking elements.

Several uniformly distributed masses are attached to the shaft. They are attached adjustably, such that their distance to the shaft can vary depending on the angular velocity of the shaft.

Attachment of the masses to the shaft is accomplished via synchronized adjustable linking elements. These elements urge movement of the masses synchronously during operation, ensuring overall stability of the device and low strain on the shaft. For example, the synchronized adjustable linking elements may be made up of a bushing, a disk, and several arms and levers. The bushing is slidingly attached to the shaft allowing sliding as necessary during operation, the sliding being coupled with movement of the masses relative to the shaft. The disk is attached to the shaft at a fixed position. Each arm is pivotally attached to the disk with a first end, and attached to one mass with a second end. Each lever has one end jointly attached to the bushing and the other end jointly attached to one arm. Thus, changes to shaft angular velocity cause changes of centrifugal forces, and the synchronized adjustable linking elements allow synchronized movement of the masses relatively to the shaft to be effected solely under the influence of the centrifugal forces.

The energy storage device can also have one or more elastic elements that are positioned to oppose movement of the masses with increased angular velocity of the shaft at least over a part of the motion path of the masses. For example, elastic elements may be of compression type and positioned such that they compress when the angular velocity of the shaft increases. In some embodiments, the elastic element or elements are pretensioned. An elastic element may be positioned between the bushing and the disk in a device of a configuration as described above, opposing movement of the bushing towards the disk. Alternatively or additionally, elastic elements may be positioned between the disk and the masses, opposing movement of the masses towards the disk. The elastic elements store some of the energy applied to the shaft in the form of potential elastic energy, and allow for large changes in the stored energy with relatively little change of the angular velocity of the shaft. Thus, changes of total energy content of the device causes motion of the masses coupled with minimal changes to shaft angular velocity.

In some embodiments the shaft is vertical, and the synchronized adjustable linking elements allow rising of the masses with increasing angular velocity. This way, some of the energy is stored as potential gravitational energy.

The energy storage devices have various applications where storage and retrieval of kinetic energy is desirable. For example, they may be used for wind farms to store kinetic energy from wind mills and retrieve it when necessary. They may also be used for the propulsion of vehicles. Other applications include hydroelectric and solar power storage and uninterrupted power supplies (UPS) where flywheel based energy storage is more desirable than battery-based UPS for short power disruption.

In some aspects, the invention relates to methods of making devices as described for storing energy. In other aspects, the invention relates to methods of accumulating or retrieving energy using the described devices.

BRIEF DESCRIPTION OF DRAWINGS

The invention is illustrated through the following figures in which:

FIG. 4A illustrates an alternative embodiment of the energy storage device.

FIG. 4B depicts the device of FIG. 4A in a minimum moment of inertia configuration.

FIG. 4C illustrates an additional component of an embodiment similar to that of FIG. 4A.

DETAILED DESCRIPTION OF PREFERRED EMBODIMENTS

Figure 1A:
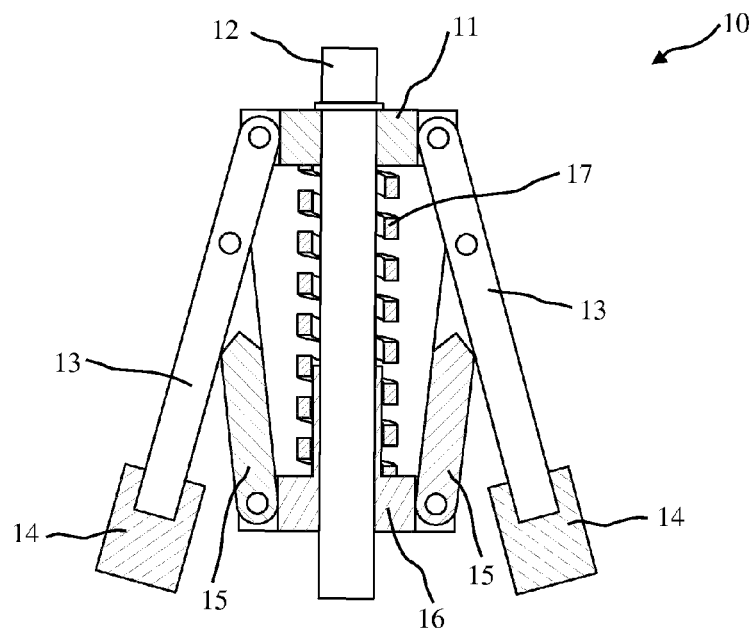
FIG. 1A is a cross-sectional view of an energy storage device assembly with a radial plane showing one of the movable masses and the connection to the flywheel when the assembly is not rotating. This position corresponds to the minimum moment of inertia.

The subject invention relates to a device that varies its moment of inertia without any external means and, at the same time, controls the shaft angular velocity. Any additional energy input to the device is stored as both rotational kinetic energy and potential elastic and gravitational energy by the synchronous motion of a plurality of masses. The potential energy is recovered when the masses are moved to positions corresponding to smaller moments of inertia. Through the selection of mass placement and elastic elements, the storage and release of energy from the energy storage device can be done with relatively small variations in shaft angular velocity.

The energy storage device comprises a disk mounted at a fixed position to a vertical shaft. In some embodiments, the disk is massive and of a significant radius, acting in operation essentially as a fixed moment of inertia flywheel. In other embodiments the disk may be a bushing serving to support the components of the device described below. The shaft connects the energy storage device to the energy source and/or to the energy consumer, depending on the relationship between the generated and the required power. The energy source could be, for example, a propeller driven by wind or water, or solar energy, or an electrical motor or internal combustion engine while the consumer could be an electrical generator or a mechanical device.

A plurality of masses, typically even-numbered, are placed such that they are distributed uniformly along the circumferential direction. Each of the masses is mounted using articulated arms to the disk and to one or more bushings that slides along the shaft. An elastic element is connected to the bushing. At rest, the masses are closest to the shaft. As energy is input through the shaft as rotational kinetic energy, the angular velocity of the whole assembly is increasing and with it also the centrifugal force acting on the masses. This force causes the masses and the arms they are mounted on to move towards the disk and out such that the forces and the torques acting on the moving parts are in equilibrium. One important aspect of the invention is that all arms are connected to the bushing such that they undergo a synchronized motion maintaining the balance of the flywheel assembly.

As more energy is input into the shaft the angular velocity continues to increase and consequently the centrifugal force acting on the masses. The masses continue to move outwards and towards the disk through the rotation of the arms holding the masses with respect to the joints connecting the arms to the disk. In some embodiments, when the angular velocity passes a threshold value, an elastic element mounted on the bushing comes in contact to the disk. Further increases in the energy input to the shaft will increase the centrifugal forces which will continue to move the masses away from the shaft and the bushing towards the disk while compressing the elastic element. Besides the rotational kinetic energy and potential gravitational energy if the shaft is vertical and energy input elevates the masses, some of the input energy will be stored in the elastic element as potential elastic energy.

The masses are placed such that they continuously move outwards during the motion of the bushing towards the disk. This configuration leads to an increasingly larger moment of inertia of the energy storage device assembly as the masses move away from the shaft. The outermost position of the masses, and consequently the largest moment of inertia, allows the largest energy to be stored.

In an alternate configuration, the elastic element is pretensioned and in contact with the bushing when the shaft is stationary. For pretensioned elastic elements, the bushing will move towards the disk only when the angular shaft velocity is larger than a threshold value at which centrifugal forces overcome the elastic force in the pretensioned elastic element. For all angular velocities smaller than the threshold value, the masses are closest to the shaft and the momentum of inertia maintains its minimum value.

The potential energy is recovered when the energy is output from the system. In such situations, the angular velocity starts to decrease which leads to a decrease in the centrifugal forces. In turn, this causes the elastic element to decompress and the masses to move away from the disk and towards the shaft reducing the moment of inertia of the assembly. The reduction of the moment of inertia will compensate for the release of the rotational kinetic energy and will minimize the change in the angular velocity.

In the figures, the depicted parts are numbered as follows: 10 energy storage device; 11 disk; 12 shaft; 13 arm; 14 mass; 15 linkage lever; 16 bushing; 17 elastic element; 38 housing; and 49 spoke.

Figure 1B:
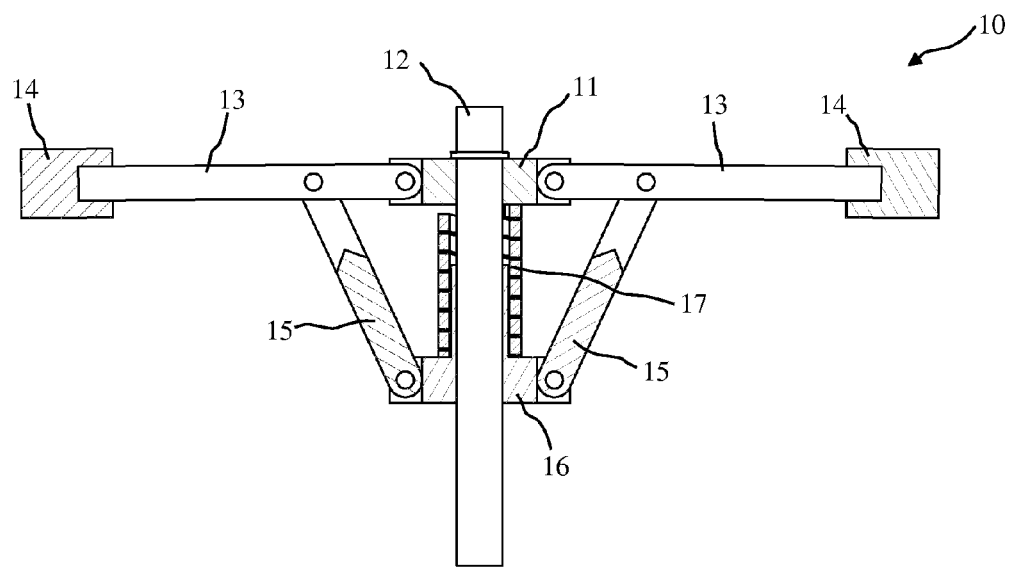
FIG. 1B displays the assembly in FIG. 1A in the position that corresponds to the maximum energy storage. In this extreme position the flywheel assembly has the largest moment of inertia.

FIGS. 1A and 1B illustrate an energy storage device 10. A disk 11 is attached to a shaft 12. The shaft is supported by one or more bearings that are not represented in the figure. At least two masses 14 are mounted on arms 13 that are articulated to the disk 11. The masses are distributed uniformly around the shaft 12 such that the center of gravity lies on the shaft axis. A linkage lever 15 connects the arm 13 to a bushing 16 that can slide along the shaft 12. The arm 13 is articulated at the end connecting to the disk 11. The lever 15 is articulated at the end connecting to the bushing 16 and the end connecting to the arm 13. The bushing 16 and the shaft 12 could be assembled by keying or splining to reduce the stresses in the arm and lever whenever the assembly undergoes changes in the angular velocity. Some elastic elements 17 are inserted between the bushing 16 and the disk 11.

The total inertia of the device consists of a fixed part represented by the sum of the moment of inertia of the disk 11, bushing 16 and elastic element 17 and a variable part represented by the sum of the moment of inertia of the plurality of the movable mass subassemblies made up of arms 13, masses 14 and linkage levers 15. FIG. 1A depicts the movable masses when the angular velocity of the shaft 12 is zero or, if the elastic element 17 is pretensioned, when the angular velocity is smaller than a threshold value represented by the angular velocity at which the centrifugal forces overcome the pretensioning force in the elastic element and thus can further deform the elastic element. The position depicted in FIG. 1A corresponds to the minimum moment of inertia.

Once the device is in motion, a centrifugal force will act on the masses 14, as well as the arms 13 and linkage levers 15. The arms 13 and masses 14 will rotate with respect to the joint between the arms 13 and the disk 11 while the bushing 16 moves along the shaft 12 towards the disk 11. The arms 13 and masses 14 will stop in a position where the centrifugal and elastic and/or gravitational forces acting on the mobile components are in equilibrium.

When the energy input into the energy storage device increases further it produces an increase in the angular velocity. The increase in the angular velocity will cause an increase in the centrifugal forces and thus an increase of the torques that rotate the arms 13 outwards, towards a new equilibrium position. The additional energy input in the device is stored as rotational kinetic energy and potential energy by the higher center of gravity (if the shaft is vertical) of the movable part of the assembly made up of arms 13, linkage lever 15, masses 14, and bushing 16.

In some embodiments, as more energy is added to the device the angular velocity increases and the bushing 16 continues to move towards the disk while the arms 13 rotate outwards which, at a certain angular velocity, brings the elastic element 17 in contact with the disk 11. Any further addition of energy will continue to move the bushing 16, arms 13 and masses 14 upwards by using the increase in the centrifugal forces to compress the elastic element 17. The new equilibrium position is determined by the torques from the gravitational forces, centrifugal forces and the new elastic force produced by the compression of the elastic element 17. The added energy continues to be stored as rotational kinetic energy and potential gravitational and elastic energy until the movable masses 14 reach the outmost position which corresponds to the operational point which is shown in FIG. 1B.

If the elastic element 17 is pretensioned it is in contact with the bushing 16 at all times. The masses 14 will move towards the disk 11 only when the angular velocity is larger than a threshold value at which the action of centrifugal forces overcomes the pretension force in the elastic element 17.

When energy is recovered from the device through the shaft 12, the angular velocity of the assembly decreases which causes the centrifugal forces to decrease. The decrease in the centrifugal forces will cause the arm 13 to move inwards, closer to the shaft 12 while they recover the potential elastic and gravitational energy and reach a new equilibrium position that corresponds to a smaller moment of inertia of the energy storage device 10. By lowering its moment of inertia, the described device will have a smaller reduction in the angular velocity than a fixed moment of inertia flywheel when releasing the same amount of the stored energy.

Figure 2A:
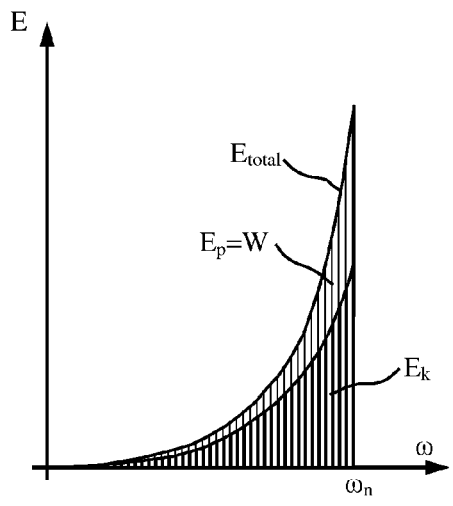
FIG. 2A shows a diagram presenting the total stored energy as a function of the angular velocity of the assembly. The total energy is composed of the stored kinetic $E_k$ energy and the potential (gravitational and elastic) energy $E_p$.

FIG. 2A shows the diagram of the stored energy as a function of the angular velocity of the shaft. The total stored energy is composed of the kinetic energy $E_k$ and the potential energy $E_p$. The stored kinetic energy continuously increases starting from zero-rest position to a maximum which is reached at the nominal angular velocity $\omega_n$. The work done against the gravitational forces and the elastic force, W, is stored as potential gravitational and elastic energy. The potential energy also increases continuously from zero angular velocity. In embodiments with vertical shafts and upward moving masses and without pretensioned elastic elements, the potential energy increases first as gravitational energy only and then as both gravitational and elastic potential energy. The potential energy maximum is also reached at the nominal angular velocity $\omega_n$. The relative size of the stored potential energy $E_p$ versus the stored kinetic energy $E_k$ depends on the masses of the fixed and the mobile parts, the distribution of the masses as well as the stiffness of the elastic element(s).

Figure 2B:
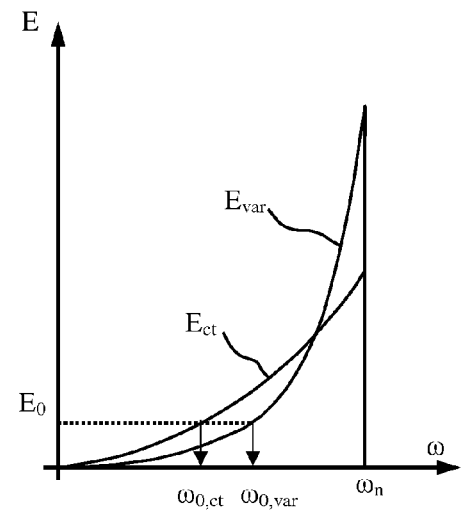
FIG. 2B presents a diagram that compares the total stored energy for the described energy storage device having a variable moment of inertia $E_{var}$ with the total stored energy for a fixed momentum of inertia flywheel $E_{cf}$. The figure also illustrates the faster initial acceleration of the described energy storage device as compared to a fixed moment of inertia flywheel.

FIG. 2B compares the storage and release of energy by a flywheel with an equivalent constant moment of inertia $E_{ct}$ to the storage and release of energy by an energy storage device with variable moment of inertia as described $E_{var}$. The maximum energy stored by the device reached at the nominal angular velocity $\omega_n$ is larger than for the constant moment of inertia flywheel because of the stored potential energy. At lower angular velocities up to the crossover point of the two curves, for the same energy stored $E_0$ the angular velocity of the constant moment of inertia flywheel is smaller than the corresponding one for the energy storage device: $\omega_{0,ct} < \omega_{0,var}$. This difference reflects the fact that, having a lower momentum of inertia, the described energy storage device accelerates faster.

Figure 2C:
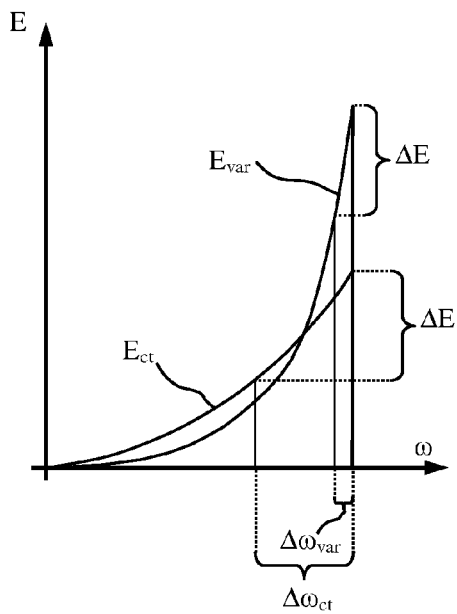
FIG. 2C shows that the release of energy $\Delta E$ for the described energy storage device occurs over a smaller range of the angular velocity $\Delta\omega_{var}$ compared to the release of the same amount of energy for a constant moment of inertia flywheel that occurs over a range of angular velocity $\Delta\omega_{cf}$.

Another advantage of the energy storage device as compared to a flywheel with a fixed moment of inertia is that for the release of a set amount of energy, the angular velocity will decrease less than when the same amount of energy is released by a constant moment of inertia flywheel. FIG. 2C shows that when the energy $\Delta E$ is released by the constant moment of inertia flywheel starting at nominal operating conditions, the angular velocity decreases by $\Delta\omega_{ct}$. When the same amount of energy $\Delta E$ is released by the energy storage device the angular velocity decreases only by $\Delta\omega_{var}$.

The reader will see that, according to one embodiment of the invention a possible construction is provided for the energy storage device with a moment of inertia variable and self adjustable based on the angular velocity. While the above application contains many specificities, these should not be construed as limitations on the scope of any embodiment, but as exemplifications of the presently preferred embodiments thereof. Many other variations are possible within the teaching of the various embodiments. For example other elastic elements can be employed in addition to or replacing element 17. These elastic elements could be placed, for example, between each of the arms 13 and the disk 11 and can be compression or extension or torsion springs. Alternate energy storage devices following the same operation principle could be constructed without any elastic elements while maintaining the synchronous motion of the arms.

Figure 3A:
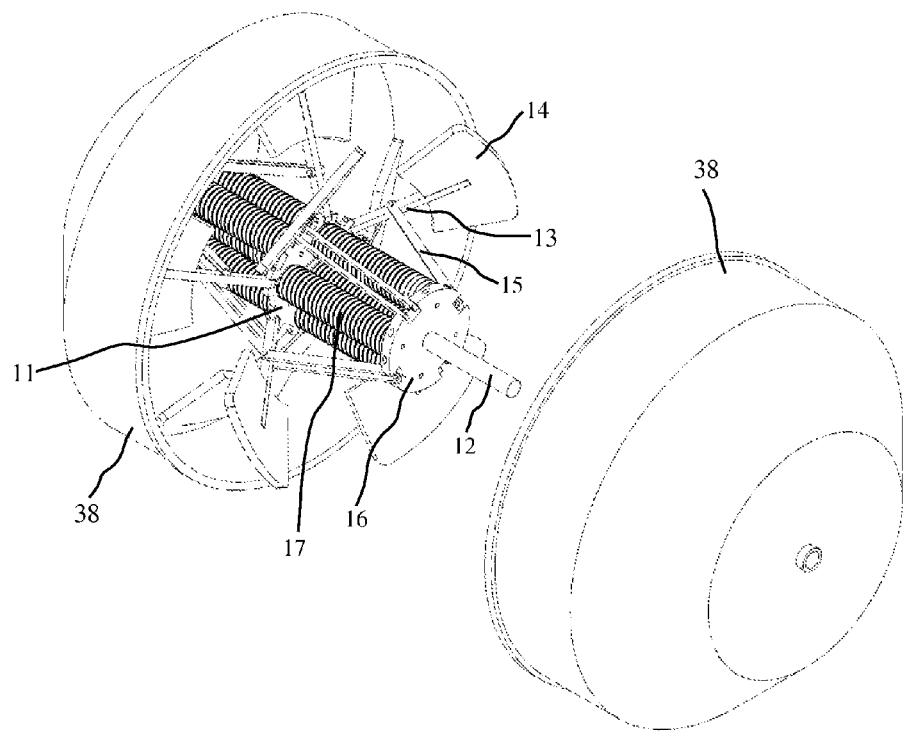
FIG. 3A illustrates an alternative embodiment of the energy storage device.
Figure 3B:
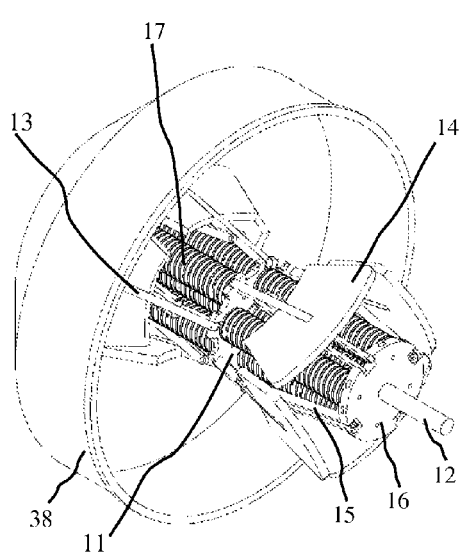
FIG. 3B depicts the device of FIG. 3A in a minimum moment of inertia configuration.
Figure 3C:
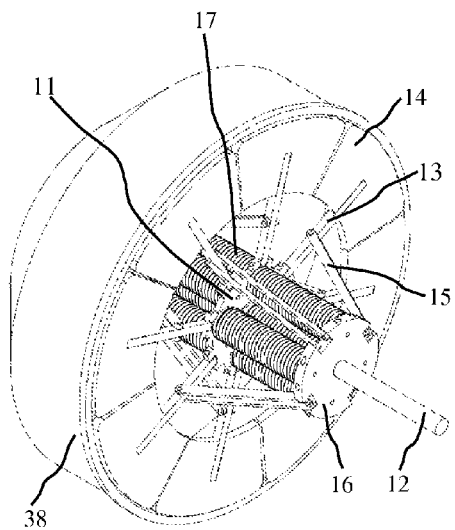
FIG. 3C depicts the device of FIG. 3A in a maximum moment of inertia configuration.

FIGS. 3 and 4 illustrate variable moment of inertia storage systems consisting of a housing made of two smooth halves 38 that rotate with the shaft 12 thus reducing the resistance caused by the relative motion of the masses with respect to the surrounding air. These configurations are compact and increase the energy density. FIG. 3A, where the assembly is depicted at an intermediate position, shows the construction of the system represented at a position corresponding to an intermediate angular velocity or moment of inertia. In this implementation, the disk 11 is placed between the two parts of the hybrid flywheel and defines the symmetry plane of the whole assembly. Two sets of masses (four in this representation) 14 each are articulated to the disk 11 using the arms 13. The two sets of arms are linked by the levers 15 to two bushings 16 that are placed symmetrically with respect to the disk 11. There are multiple (in the illustrated configuration five; one is central and not visible) elastic elements between each bushing 16 and disk 11 opposing the outwards motion of the arms 13 and masses 14. The placement of the masses and arms is such that the ones articulated to the same bushing 16 fold together (FIG. 3B). When the moment of inertia is maximum, all arms 13 are placed radially and the masses of the two halves become interlaced while they unfold into the plane of symmetry defined by disk 11 to form a disk like structure (FIG. 3C).

FIG. 4A depicts a different implementation where masses 14 are articulated to the bushings 16 with two arms 13. The disk 11 defines the symmetry plane of the assembly with the masses moving radially in this plane. FIG. 4A shows an example with eight masses and nine elastic elements 17 (one for each mass placed on the periphery and one in the center) on each side of the symmetry plane. When the angular velocity is small, the elastic elements are fully extended and thus the masses are at a minimum distance from the axis (FIG. 4B). As the angular velocity increases the elastic elements are compressed and the masses move in the symmetry plane, each of them along its corresponding radial direction, to reach the position with the maximum moment of inertia (FIG. 4A).

A variation is shown in FIG. 4C. The addition consists of spokes 49 that pass through guiding channels, bushings or linear bearings placed in the masses 14. The motion of the masses is still radial and along the spokes. The addition of the spokes reduces the loading on the arms 13 that connect the masses 14 with the bushings 16 during sudden changes of the shaft's angular velocity.

The invention provides several advantages compared to current related technologies, although all advantages are not necessarily present in every embodiment of the invention. One advantage of the invention is that, through careful selection of the elastic element(s), the masses, their placement and articulation points of the arms, it is possible to release a large part of the maximum stored energy with only a small variation in the angular velocity of the flywheel. For the described invention the energy can also be stored as elastic and/or gravitational energy, in addition to kinetic energy that would be stored in a fixed moment of inertia flywheel. Another advantage is that by connecting all masses to the bushing their motion is synchronized and thus the flywheel remains balanced with no additional control required. The invention does not require adjustment of the moment of inertia by external means, and so it does not require additional energy and control systems. Maximum energy storage occurs at lower velocities, imposing less strain on some of the components. The design of the energy storage device is relatively simple, making its manufacturing easier and its useful operation lifetime longer. When compared to methods of changing the moment of inertia by moving liquid around, the described device is capable of a larger range of adjustment of the moment of inertia because the fluids used have smaller density. In comparison to the fixed moment of inertia flywheels, the proposed system weighs less for the same maximum moment of inertia.

Foregoing described embodiments of the invention are provided as illustrations and descriptions. They are not intended to limit the invention to the precise form described. Other variations and embodiments are possible in light of above teachings, and it is thus intended that the scope of invention not be limited by this Detailed Description, but rather by the following claims.

What is claimed is:

1. A device for energy storage comprising:
   a shaft;
   a plurality of masses;
   synchronized adjustable linking elements attaching each of the masses to the shaft at a distance, wherein the distance is variable under centrifugal forces, and wherein the synchronized adjustable linking elements urge the masses synchronously; and
   one or more elastic elements positioned to oppose with elastic forces an increase of the distance,
   wherein a shaft angular velocity causes synchronized adjustment of the distance such that the centrifugal forces balance the elastic forces,
   whereby changes of total energy content of the device causes motion of the masses coupled with minimal changes to shaft angular velocity.

2. The device of claim 1 wherein the elastic elements are pretensioned.

3. The device of claim 1 wherein the elastic elements are of compression type and are positioned such that they compress when the angular velocity of the shaft increases.

4. The device of claim 1 wherein the shaft is vertical, and wherein the synchronized adjustable linking elements allow rising of the masses with increasing angular velocity.

5. The device of claim 1 wherein the synchronized adjustable linking elements comprise a bushing slidingly attached to the shaft, a disk attached to the shaft, arms having a first end pivotally attached to the disk and a second end attached to the masses, and levers with one end jointly attached to the bushing and the other end jointly attached to the arms.

6. The device of claim 5 wherein the elastic element is positioned to oppose movement of the bushing towards the disk.

7. A method of making an energy storing device, the method comprising:
providing a shaft,
attaching a plurality of masses to the shaft via synchronized adjustable linking elements at a distance, wherein the distance is variable under centrifugal forces, and
attaching one or more elastic elements positioned to oppose with elastic forces an increase of the distance, wherein application of a angular velocity to the shaft causes synchronized movement of the masses relatively to the shaft to the distance where the centrifugal forces balance the elastic forces.

8. The method of claim 7 further comprising orienting the shaft vertically, wherein the synchronized adjustable linking elements allow rising of the masses with increasing angular velocity.

9. The device according to claim 1 further comprising a housing attached to the shaft, wherein the housing encloses the masses and linking elements.

10. A method of using energy, the method comprising
providing an energy storage device according to claim 1,
storing when available excess energy into the device by applying forces tending to increase the angular velocity of the shaft, and
retrieving when needed energy from the device by applying forces tending to decrease the angular velocity of the shaft of the energy storage device.

\* \* \* \* \*